US012444396B2

(12) United States Patent
Tackett

(10) Patent No.: US 12,444,396 B2
(45) Date of Patent: Oct. 14, 2025

(54) SYSTEM AND METHOD FOR ADJUSTING ACTIVE NOISE CANCELLATION TUNING PARAMETERS

(71) Applicant: Harman International Industries, Incorporated, Stamford, CT (US)

(72) Inventor: Jeffrey Charles Tackett, Allen Park, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 240 days.

(21) Appl. No.: 18/238,855

(22) Filed: Aug. 28, 2023

(65) Prior Publication Data

US 2025/0078798 A1 Mar. 6, 2025

(51) Int. Cl.
*G10K 11/178* (2006.01)

(52) U.S. Cl.
CPC .. *G10K 11/17817* (2018.01); *G10K 11/17825* (2018.01); *G10K 11/17881* (2018.01); *G10K 11/17823* (2018.01); *G10K 2210/12821* (2013.01); *G10K 2210/30232* (2013.01); *G10K 2210/3026* (2013.01); *G10K 2210/3027* (2013.01); *G10K 2210/3028* (2013.01); *G10K 2210/3044* (2013.01); *G10K 2210/3046* (2013.01); *G10K 2210/3055* (2013.01)

(58) Field of Classification Search
CPC ....... G10K 11/17817; G10K 11/17823; G10K 11/17825; G10K 11/17854; G10K 2210/3055; G10K 2210/3033
See application file for complete search history.

(56) References Cited

U.S. PATENT DOCUMENTS

2018/0070191 A1* 3/2018 Chang .................. G10K 11/178
2024/0144905 A1 5/2024 Basu et al.
2024/0147151 A1 5/2024 Basu et al.

FOREIGN PATENT DOCUMENTS

EP 3761307 B1 6/2023
KR 20230012857 A 1/2023
WO 2022031279 A1 2/2022

OTHER PUBLICATIONS

Extended European Search Report dated Jan. 17, 2025 for European Patent Application No. 24195211.8 filed Aug. 19, 2024, 18 pgs.

(Continued)

*Primary Examiner* — Kile O Blair
(74) *Attorney, Agent, or Firm* — BROOKS KUSHMAN P.C.

(57) ABSTRACT

In at least one embodiment, an active noise cancellation (ANC) system is provided. The system includes at least one audio signal source, at least one loudspeaker, at least one microphone, and at least one controller. The at least one controller is programmed to receive a first error signal and a second error signal and to provide an estimated impulse response based at least on the first error signal and the second error signal. The at least one controller is programmed to select a first pre-stored impulse response from a plurality of pre-stored impulse responses based on the estimated impulse response to filter one or more reference signals at an adaptive filter to generate the anti-noise signal and to select a first plurality of pre-stored tuning parameters from a plurality of pre-stored sets of the tuning parameters based on the first pre-stored impulse response.

20 Claims, 8 Drawing Sheets

Fig-2

(56) References Cited

OTHER PUBLICATIONS

Sun, C. et al., “A New Online Secondary Path Modeling Method with an Auxiliary Noise Power Scheduling Strategy for Narrowband Active Noise Control Systems”, Nov. 29, 2017, 14 pgs.
Elliott, S.J., “Signal Processing for Active Control—Chapter 1: The Physical Basis for Active Control”, 2001, p. 41.
Elliott, S.J., “Signal Processing for Active Control—Chapter 2: Optimal and Adaptive Digital Filters”, 2001, pp. 79-87.
Elliott, S.J., “Signal Processing for Active Control—Chapter 3: Single-Channel Feedforward Control”, 2001, pp. 134-135 and pp. 139-154.
Elliott, S.J., “Signal Processing for Active Control—Chapter 4: Multichannel Control of Tonal Disturbances”, 2001, pp. 177-232.
Elliott, S.J., “Signal Processing for Active Control—Chapter 5: Multichannel Control of Stochastic Disturbances”, 2001, pp. 247-265.
Elliott, S.J., “Signal Processing for Active Control—Chapter 8: Active Control of Nonlinear Systems”, 2001, pp. 405-407.

* cited by examiner

SYSTEM AND METHOD FOR ADJUSTING ACTIVE NOISE CANCELLATION TUNING PARAMETERS

TECHNICAL FIELD

Aspects disclosed herein generally relate to a system and method for adjusting Active Noise Cancellation (ANC) tuning parameters. These aspects and others will be discussed in more detail herein.

BACKGROUND

Active noise cancellation (ANC) systems attenuate undesired noise using feedforward and feedback structures to adaptively remove undesired noise within a listening environment, such as within a vehicle cabin. ANC systems cancel, or reduce, unwanted noise by generating cancellation sound waves to destructively interfere with the unwanted audible noise. ANC systems implemented on a vehicle that minimize noise inside the vehicle cabin include a Road Noise Cancellation (RNC) system, which minimizes unwanted road noise, and an Engine Order Cancellation (EOC) system, which minimizes undesirable engine noise inside the vehicle cabin.

Typically, ANC systems use digital signal processing and digital filtering techniques. For example, a noise sensor, such as a microphone an accelerometer or a revolutions per minute (RPM) sensor, outputs an electrical reference signal representing a disturbing noise signal generated by a noise source. This reference signal is fed to an adaptive filter. The filtered references signal is then supplied to an acoustic actuator, for example a loudspeaker, which generates a compensating sound field, which may ideally have an opposite phase and close to identical magnitude to the noise signal. This compensating sound field eliminates, or reduces, the noise signal within the listening environment.

The RNC system is a specific ANC system implemented on a vehicle to minimize undesirable road noise inside the vehicle cabin. RNC systems use vibration sensors to sense road induced vibration generated from the tire and road interface that leads to unwanted audible road noise. Cancelling such road noise results in a more pleasurable ride for vehicle passengers, and it enables vehicle manufacturers to use lightweight materials, thereby decreasing energy consumption and reducing emissions. The EOC system is a specific ANC system implemented on a vehicle to minimize undesirable engine noise inside the vehicle cabin. EOC systems use a non-acoustic sensor, such as an engine speed sensor, to generate a signal representative of the engine crankshaft rotational speed in revolutions-per-minute (RPM) as a reference. RNC systems are typically designed to cancel broadband signals, while EOC systems are designed and optimized to cancel narrowband signals, such as individual engine orders. ANC systems within a vehicle may provide both RNC and EOC technologies.

A residual noise signal may be measured, using a microphone, to provide an error signal to the adaptive filter's adaptation unit, where filter coefficients (also called parameters) of the adaptive filter are modified such that a norm of the error signal is produced. The adaptive filter's adaptation unit may use digital signal processing methods, such as least means square (LMS), filtered-x least mean square (FxLMS), modified filtered-x least mean square (MFxLMS) or other technique to reduce the error signal.

An estimated model that represents an acoustic transmission path from the loudspeaker to the microphone is used when applying many variants of the LMS algorithm, such as the FxLMS and MFxLMS algorithms. This acoustic transmission path is typically referred to as the secondary path of the ANC system. In contrast, the acoustic transmission path from the noise source to the microphone is typically referred to as the primary path of the ANC system. The secondary path transfer function represented in the time domain is often termed the impulse response, or IR.

The manner in which the estimated secondary path transfer function matches the actual secondary path transfer function, influences the stability of the ANC system. A varying secondary path transfer function can have a negative impact on the ANC system because the actual secondary path transfer function, when subjected to variations, no longer matches an "a priori" estimated secondary path transfer function that is used in the FxLMS or MFxLMS algorithm. The estimated model of the secondary path is typically measured once during the production tuning process and approximates the secondary path transfer function and during the production tuning process, the secondary path transfer function is estimated for a "nominal" acoustic scenario (i.e., one occupant, windows closed, seats in default positions). However, the secondary path can vary for many different reasons, like changes in occupancy count, seat positions, items in the listening environment. These differences between the stored, estimated secondary path and the actual secondary path may lead to inadequate noise cancellation system performance, or even to diverging adaptive filters, which causes undesirable noise being generated in the listening environment, often termed noise boosting.

SUMMARY

In at least one embodiment, an active noise cancellation (ANC) system is provided. The system includes at least one audio signal source, at least one loudspeaker, at least one microphone, and at least one controller. The at least one loudspeaker projects anti-noise sound within the cabin of a vehicle in response to receiving an anti-noise signal. The at least one microphone provides a first error signal indicative of noise, the audio signal, and the anti-noise sound within the cabin and a second error signal indicative of an estimated anti-noise signal. The at least one controller is programmed to receive the first error signal and the second error signal and to provide an estimated impulse response based at least on the first error signal and the second error signal. The at least one controller is programmed to select a first pre-stored impulse response from a plurality of pre-stored impulse responses based on the estimated impulse response to filter one or more reference signals at an adaptive filter to generate the anti-noise signal and to select a first plurality of pre-stored tuning parameters from a plurality of pre-stored sets of the tuning parameters based on the first pre-stored impulse response. The at least one controller is programmed to tune the adaptive filter with the first plurality of pre-stored tuning parameters to generate the anti-noise signal.

In at least another embodiment, an active noise cancellation (ANC) system is provided. The system includes at least one audio signal source, at least one loudspeaker, at least one microphone, and at least one controller. The at least one loudspeaker projects anti-noise sound within the cabin of a vehicle in response to receiving an anti-noise signal. The at least one microphone provides a first error signal indicative of noise, the audio signal, and the anti-noise sound within the cabin and a second error signal indicative of an estimated anti-noise signal. The at least one controller is programmed to receive the first error signal and the second error signal and to provide an estimated impulse response based at least on the first error signal and the second error signal. The at least one controller is further programmed to select a first pre-stored impulse response from a plurality of pre-stored impulse responses based on the estimated impulse response to filter one or more reference signals at an adaptive filter to generate the anti-noise signal and to select a first plurality of tuning parameters based at least on one of a constant offset that is applied to one or more baseline tuning parameters and a variable offset value that is applied to the one or more baseline tuning parameters. The at least one controller is further programmed to tune the adaptive filter with the first plurality of tuning parameters to generate the anti-noise signal.

In at least another embodiment, a method for performing active noise cancellation (ANC) is provided. The method includes generating an audio signal to transmit in a cabin of a vehicle with at least one audio signal source and transmitting an anti-noise sound in the cabin of the vehicle via at least one loudspeaker in response to receiving an anti-noise signal. The method further includes providing a first error signal indicative of noise, the audio signal, and the anti-noise sound within the cabin and a second error signal indicative of an estimated anti-noise signal and receiving the first error signal and the second error signal by at least one controller. The method further includes providing an estimated impulse response based on the first error signal and the second error signal and selecting a first pre-stored impulse response from a plurality of pre-stored impulse responses based on the estimated impulse response to filter one or more reference signals at an adaptive filter to generate the anti-noise signal. The method further includes selecting a first plurality of pre-stored tuning parameters from a plurality of pre-stored sets of the tuning parameters based on the first pre-stored impulse response and tuning the adaptive filter with the first plurality of pre-stored tuning parameters to generate the anti-noise signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Adaptive feedforward ANC algorithms such as engine order cancellation (EOC) and road noise cancellation (RNC) include a static estimate of a secondary path impulse response (IR) between loudspeakers and error microphones. In one example, the IR has been measured in a predetermined preproduction vehicle or vehicles to create one IR estimate that is stored in each of the large number of production vehicles that are produced. This, and the fact that the cabin configuration of any particular vehicle can change during runtime, can create a mismatch between the actual and stored secondary path IRs. This mismatch may lead to degraded noise cancellation performance, and in some cases, it may lead to undesirable noise boosting.

As described herein, the disclosed system and method intelligently update the static secondary path IR using an estimate of the actual cabin configuration to maintain noise cancellation performance. The estimated cabin configuration may be derived using a number of approaches which include generating test signals and measuring the response through the microphones or any other adaptive model of the cabin acoustics. The estimated IRs are processed by an IR matching algorithm such as a fingerprinting technique to obtain the closest match from a bank of pre-measured IRs. The disclosed system and method provide for determining if, when, and the manner in which secondary path IRs may be estimated and updated. Aspects disclosed herein, provides, among other things, a number of techniques for detecting changes in cabin acoustics and safely updating the static secondary path IRs to achieve better noise cancellation performance for multiple cabin acoustic configurations.

Figure 1:
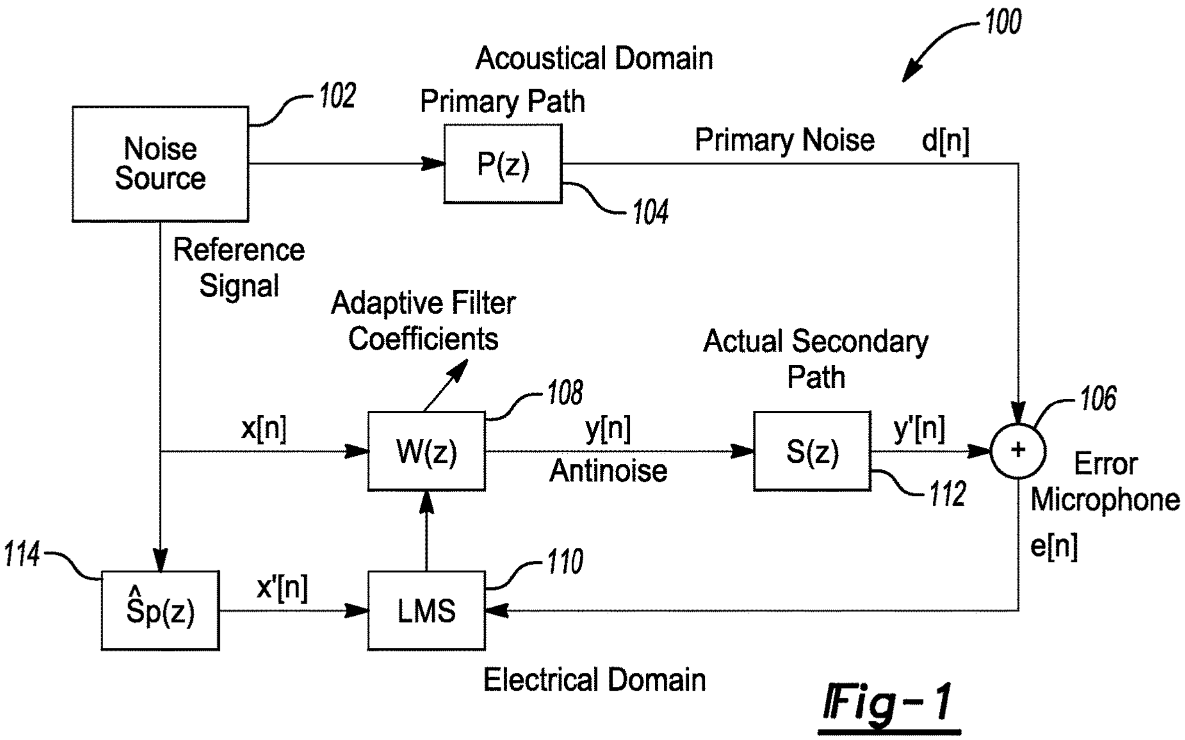
FIG. 1 generally depicts one example of an FxLMS Active Noise Cancellation (ANC) system.

FIG. 1 generally depicts one example of an Active Noise Cancellation (ANC) system 100. The ANC system 100 may be a Filtered-x Least Mean Squared (FxLMS) based ANC system. The system 100 includes a noise source 102 and a primary noise signal, d[n], that passes through an airborne or structure bourne transfer path 104 (or primary path) having a primary path transfer function, P(z) (or primary path 104). P(z) represents the transfer characteristics of a signal path between the noise source 102 and an error microphone 106. An adaptive filter 108 is a transfer function, W(z), having an adaptation unit 110 (or adaptive filter controller 110) that calculates a set of filter coefficients (also called parameters) for the adaptive filter 108. An actual secondary path (or transfer function) 112 is (or is characterized by the transfer function), S(z), downstream of the adaptive filter 108. The transfer function, S(z), represents the airborne and electrical signal path between a loudspeaker that radiates a compensation signal and a microphone position in the listening environment. An anti-noise signal, y'[n] includes the transfer characteristics of all components downstream of the adaptive filter 108, including, for example, amplifiers, digital-to-analog converters, loudspeakers, acoustic transmission paths, microphones, and analog-digital converters. An estimated secondary path system 114, has a modeled or measured transfer function Ŝp(z) that represents the actual secondary path transfer function S(z), and is used by the adaptation unit 110 to calculate the filter coefficients of the transfer function, W(z) for the adaptive filter 108. The primary path 104 and the actual secondary path 112 represent the physical properties of the listening environment. The transfer functions W(z), and Ŝp(z) are implemented in a digital signal processor.

The noise source 102 provides a signal to the primary path 104 which provides a disturbing noise signal, d[n], at the error microphone 106. The noise source 102 also provides a reference signal, x[n] to the adaptive filter 108, which imposes a phase and magnitude shift and outputs a filtered anti-noise signal y[n] to the actual secondary path transfer function 112 which outputs a signal, y'[n], that destructively interferes with the primary noise signal d[n] at the error microphone location. The reference signal, x[n], may be derived from a source that is correlated with the primary noise source 102, such as engine RPM or a microphone or accelerometer. A measurable residual signal represents an error signal, e[n], for the adaptation unit 110. The estimated secondary path transfer function Ŝp(z) is used to calculate updated filter coefficients. This compensates for decorrelation between the anti-noise signal y[n] and a filtered anti-noise signal, y'[n], due to the transfer function characterizing the secondary path. The secondary path transfer function Ŝp(z) also receives the reference signal, x[n], characterizing the noise source 102 and provides a filtered reference signal x'[n] to the adaptation unit 110.

The quality of the estimated secondary path transfer function Ŝp(z) influences the stability of the system 100. Deviation of the estimated secondary path transfer function Ŝp(z) from the actual secondary path transfer function S(z) affects convergence and stability behavior of the adaptation unit 110. Unstable behavior or suboptimal noise cancellation may be caused by changes in the ambient conditions in the listening environment, which lead to changes in the actual secondary path transfer function S(z). i.e., changes in the listening environment led to differences between Ŝp(z) and S(z). For example, when the listening environment is a vehicle cabin, changes in ambient conditions may occur when a window is opened, the seat positions are adjusted, or by the addition of items or passengers on one or more seats in the listening environment.

Figure 2:
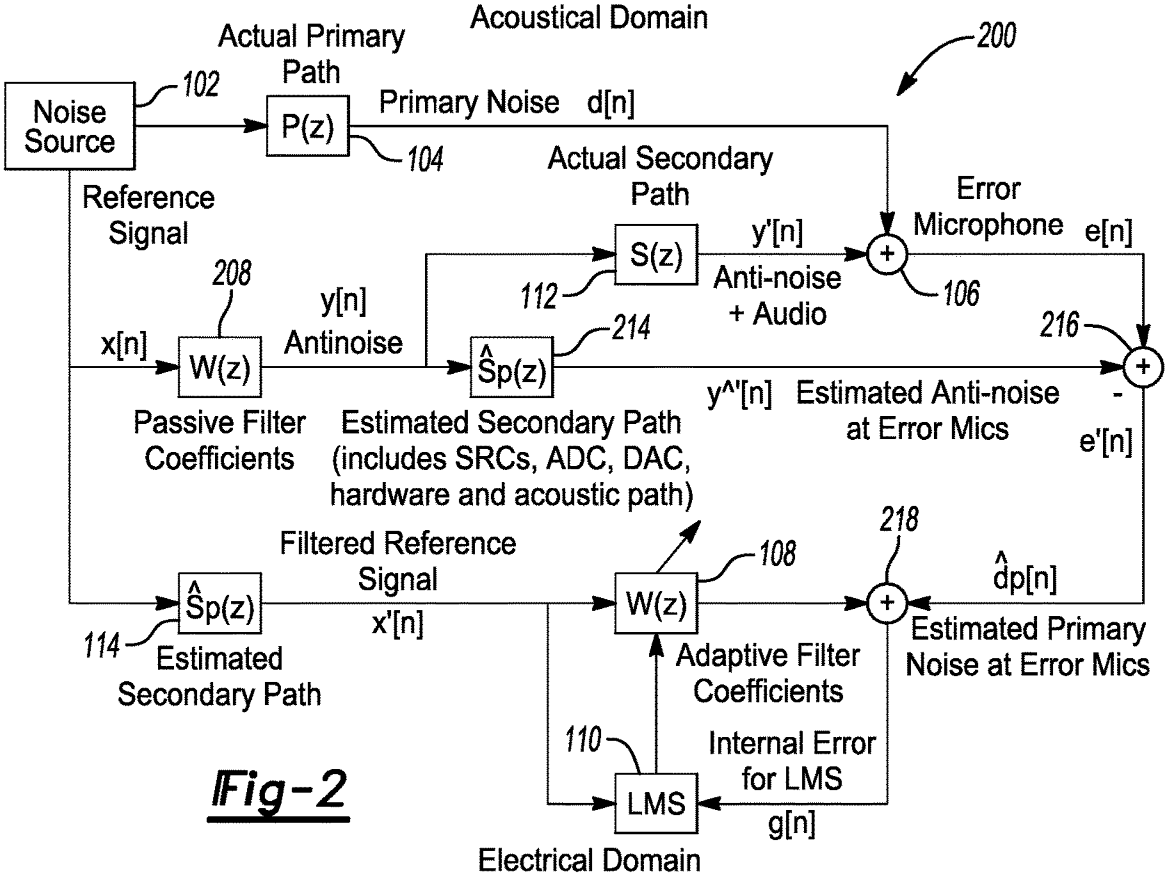
FIG. 2 generally depicts an example of an MFxLMS ANC system.

A second topology for a noise cancellation system is shown in block diagram FIG. 2, which is similar to the filter arrangement shown in FIG. 1 but includes an additional adaptive filter arrangement in parallel with the secondary path system. FIG. 2 is a modified filtered-x LMS (MFxLMS) feedforward noise cancellation system 200. The reference signal x[n] is filtered by the first estimated secondary path filter 114 with the adaptive filter 108 having transfer function W(z). Coefficients of the first estimated secondary path filter 114 are referred to as active filter coefficients. The dynamic system also includes a second adaptive filter 208 which filters the reference signal x[n] with a transfer function W(z) to generate the anti-noise signal y[n]. The anti-noise signal y[n] is filtered by the actual secondary path transfer function S(z) or 112. The signal y'[n] is audible anti-noise at the error microphone 106 as filtered by the actual secondary path transfer function S(z), 112. The filtered anti-noise signal y'[n] combines at the error microphone with primary noise d[n] as filtered by the actual primary path transfer function P(z) 104.

In the electrical domain, the anti-noise signal y[n] is filtered by a second secondary path transfer characteristic Ŝp(z) 214 and subtracted from the error signal, e[n], at adder 216 (or microphone). This results in an estimated noise signal, d^_p[n], at the error microphone 106. The estimated noise signal d^_p[n] is combined with the signal filtered by the adaptive filter 108 at adder 218 to generate an internal error signal g[n]. The internal error signal g[n] is an input to the adaptation unit 110.

In practice, the secondary path estimate IRs are estimated only once for the listening environment with optimal conditions. For a vehicle cabin listening environment, this takes place only during the production tuning process before the vehicle leaves the production facility. Furthermore, the estimated secondary path IRs represent the listening environment in a nominal configuration. For example, when the listening environment is a vehicle cabin, a nominal configuration is the vehicle in park, not moving, with one driver, no other passengers, and all the windows, doors, sunroof and trunk fully closed.

The secondary path estimation process involves playing a test signal from each speaker to excite the electro-acoustic path followed by a deconvolution step. These secondary path estimates remain fixed thereafter for the lifetime of the vehicle. When the acoustic environment within the listening environment changes during runtime, for example when the vehicle is being driven with one or more windows partially open and multiple passengers or items in the seats, a mismatch between the actual and stored IRs results.

In a listening environment in real time, the stored IR for Ŝp(z) may differ from the actual IR of the secondary path, S(z), and this mismatch may eventually result in degraded ANC performance or in divergence of the W(z) filters, creating unbounded noise boosting within the passenger cabin. When Ŝp(z) better matches S(z), the resulting estimate of d^_p[n] more accurately represents the primary noise signal that is present in the listening environment, and adaptive filters W(z) are much more likely to avoid divergence. Additionally, when Ŝp(z) better matches S(z), a more aggressive tuning approach may be used to increase the noise cancellation performance, because the risk of divergence has been reduced.

The system(s) and method(s) disclosed herein, may among other things, improve the accuracy of the stored estimates, replacing the stored estimates during system operation after calculating new secondary path IRs, online in real time in a near-imperceptible manner. These methods apply to FxLMS and MFxLMS systems described in FIGS. 1 and 2, respectively, and function to calculate Ŝp(z) parameters without the need for generating a test signal. In addition, it is also possible to find unique Ŝp(z) solutions under MIMO conditions and determine if, when, and how to change the Ŝp(z) parameters. In addition, the disclosed system(s) and method(s) calculate and update the stored estimates in a manner that is nearly imperceptible to the listener in the listening environment. Any updates that are made to the transfer function coefficients will be inaudible to a listener in the listening environment. The update is so slight, gradual, or subtle that it is not perceived by or affects the listener's senses making it go unnoticed.

With conventional implementation of ANC systems, the IRs for the Ŝp(z) are estimated only once during the production tuning process. In general, the IRs represent S(z) under a nominal cabin scenario (e.g., one driver, windows and doors closed, sunroof closed etc.) and remain fixed thereafter for the lifetime of the vehicle. The IR estimation process performed during the tuning process can involve playing test signals (e.g., broadband noise or sine sweeps) to excite and characterize an electro-acoustic path which is followed by a deconvolution step to determine the IR coefficients.

In general, once production tuning is complete (e.g., when the vehicle software is finalized and the vehicle has been sold and is being operated by customers), the IRs (S(z)) may differ from the estimated IRs ($\hat{S}p(z)$) due to a variety of reasons. Such reasons may involve changes in occupancy, temperature, seat position or window position, etc. This mismatch may result in degraded ANC performance and may eventually result in divergence of the W(z) filters leading noise boosting. One strategy to mitigate the effects of divergence is to tune the ANC algorithm in a more conservative way. This may include setting tunable limiters on the anti-noise outputs or lowering a step-size of the ANC algorithm or increasing the leakage of the ANC system. However, such approaches may undesirably lead to reduced noise cancellation performance of the ANC system.

One approach to solve the S(z) to $\hat{S}p(z)$ mismatch problem may include simply remeasuring IRs and loading parameters for the estimated secondary path $\hat{S}p(z)$ with IRs that more closely match the actual secondary path S(z). Such an approach, however, may not be desirable, as this involves subjecting the customers seated in the vehicle to a suite of audible and unpleasant test signals for the entire life of the vehicle. If $\hat{S}p(z)$ matches S(z) more closely, the resulting error feedback signal e[n] (or g[n]) represents the noise cancellation performance in the vehicle cabin more accurately. Under these conditions, the adaptive filters W(z) are then less likely to misadjust. In addition, with $\hat{S}p(z)$ matching S(z) better, a more aggressive tuning (resulting in better noise cancelation) can be used because there is lower risk of divergence.

There are several factors to consider when re-estimating and changing the $\hat{S}p(z)$ IRs during runtime. For the disclosed system(s), the ANC system should include a method for re-estimating $\hat{S}p(z)$ during normal vehicle operation (e.g., this will be referred to as updating $\hat{S}p(z)$ with the value of $\hat{S}pu(z)$). The measurement system for $\hat{S}pu(z)$) may be embodied in various ways. This may include implementations such as:

- generating non-invasive, sub-audible sine sweeps or other test signals at a speaker output and measuring the response at the microphones to derive $\hat{S}pu(z)$;
- adaptive filters that use speaker outputs (e.g., audio, vehicle prompts, chimes) and microphone measurements to derive $\hat{S}pu(z)$;
- deep learning or system identification techniques that derives a $\hat{S}pu(z)$ for some or all secondary paths; and/or
- by simply playing pink noise or a sine sweep from each speaker of interest in a manner that is audible to the passengers of the occupied vehicle or in a manner which is less disturbing to the occupants of the vehicle because the vehicle is unoccupied at the time of the test signal is being played. From these test signals received at the microphones of interest, it is possible to derive $\hat{S}pu(z)$ using various methods.

With respect to the adaptive filters that are updated to estimate $\hat{S}pu(z)$ such updates may also take place at least once and any time after the vehicle is purchased. One or more of the implementations as noted above may be implemented as, for example, a state machine which will be described in more detail in connection with FIG. 4.

Figure 3:
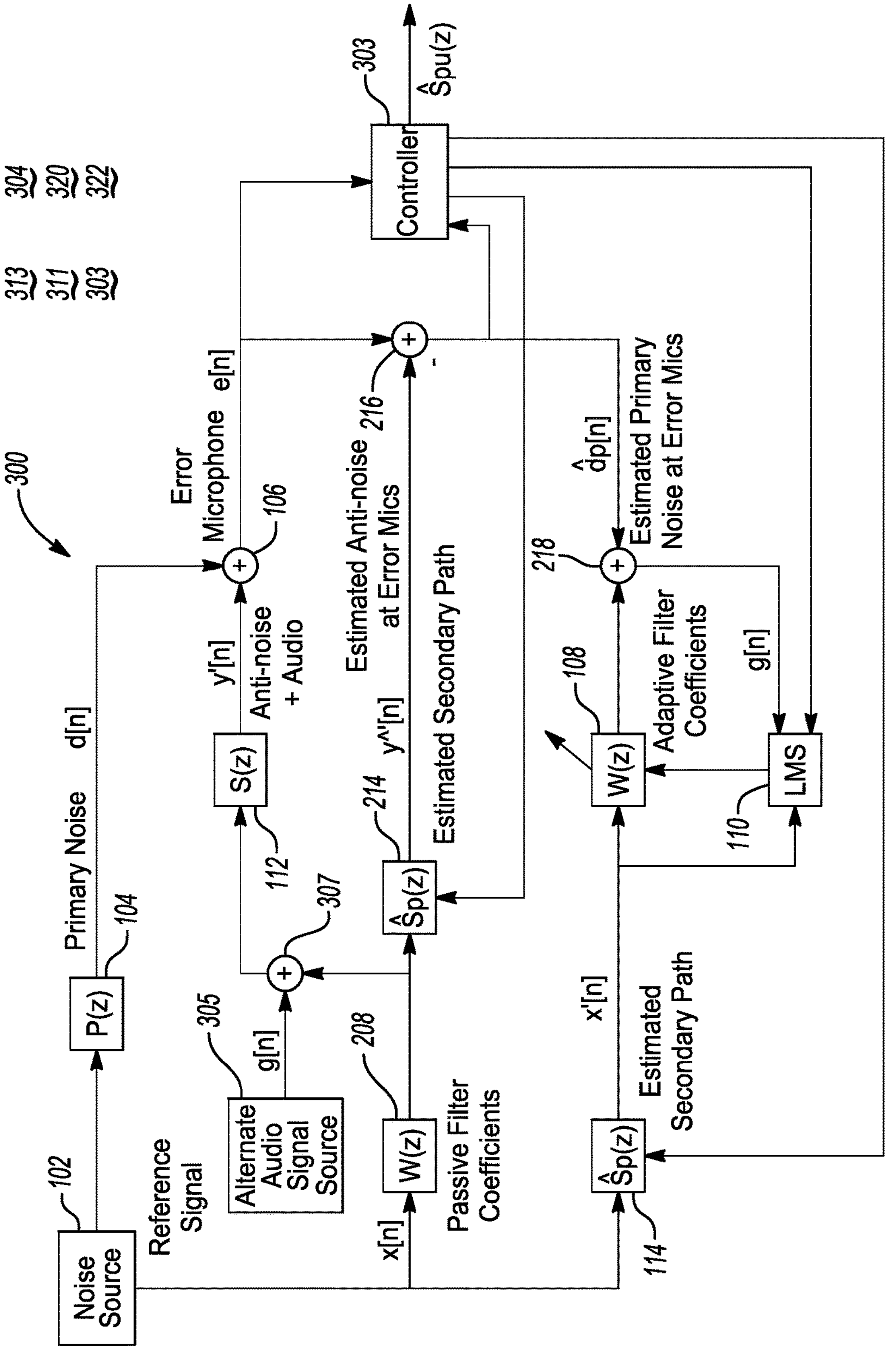
FIG. 3 generally depicts a system for performing secondary path switching using impulse response (IR) fingerprinting.

FIG. 3 generally depicts a system 300 for performing secondary path switching using impulse response (IR) fingerprinting in accordance with one embodiment. The system 300 includes at least one controller 303 (hereafter, the controller 303) and memory 304. The controller 303 is configured to perform a secondary path impulse response estimation to provide an estimate of the current value of $\hat{S}pu(z)$. The system 300 includes at least one loudspeaker 311 (hereafter loudspeaker) that generates an anti-noise sound (e.g., in a cabin of a vehicle 313) in response to the anti-noise signal y[n]. The system 300 may utilize a number of the techniques to provide the estimate of the current value of $\hat{S}pu(z)$. Various techniques that provide the estimate of the current value of $\hat{S}pu(z)$ is set forth in U.S. Ser. No. 17/976,048 filed on Oct. 28, 2022 (the '048 application) the disclosure of which is hereby incorporated by reference in its entirety.

For any of the implementations or methods that provide the estimate of the current value of $\hat{S}pu(z)$, the system 300 includes an alternate audio signal source 305 to provide an additional signal to each loudspeaker 311 of interest. The system 300 includes at least one loudspeaker 311 (hereafter loudspeaker) that generates an anti-noise sound (e.g., in a cabin of a vehicle 313) in response to the anti-noise signal y[n]. The signal e[n] or $\hat{d}p[n]$ as received at each microphone 216 of interest provides a current value of $\hat{S}pu(z)$ to the controller 303. In general, any 'in-situ' measurements or estimates of $\hat{S}pu(z)$ as performed by the system 300 may include additional, unwanted noise that would not be present in the original, preproduction characterization of $\hat{S}(z)$. The presence of this additional noise may make this in-situ measurement of $\hat{S}pu(z)$) a somewhat less accurate representation of the in-situ S(z) than the original, preproduction $\hat{S}p(z)$ was of S(z) at the original time of measurement. These additional noise sources that are present at the time of measuring $\hat{S}pu(z)$ include any one or more of engine noise, electric motor noise, wind noise, music noise, the noise of phone calls or conversation in the vehicle, HVAC noise, traffic noise, the noise of cityscape or noises of other nearby vehicles that invades the car cabin. It is the presence of these additional noises that make the fingerprinting of $\hat{S}pu(z)$ (or the estimation of $\hat{S}pu(z)$) necessary to produce optimal noise cancellation. One aim of the fingerprinting approach is to use the noisy $\hat{S}pu(z)$ to select which of the predetermined, prestored, or measured $\hat{S}p(z)$ with each selected $\hat{S}p(z)$ corresponding to a different cabin configuration that best represents the current cabin configuration of the vehicle. As this measured set of $\hat{S}p(z)$ may result in optimal noise cancellation and provide a stable system performance.

Figure 4:
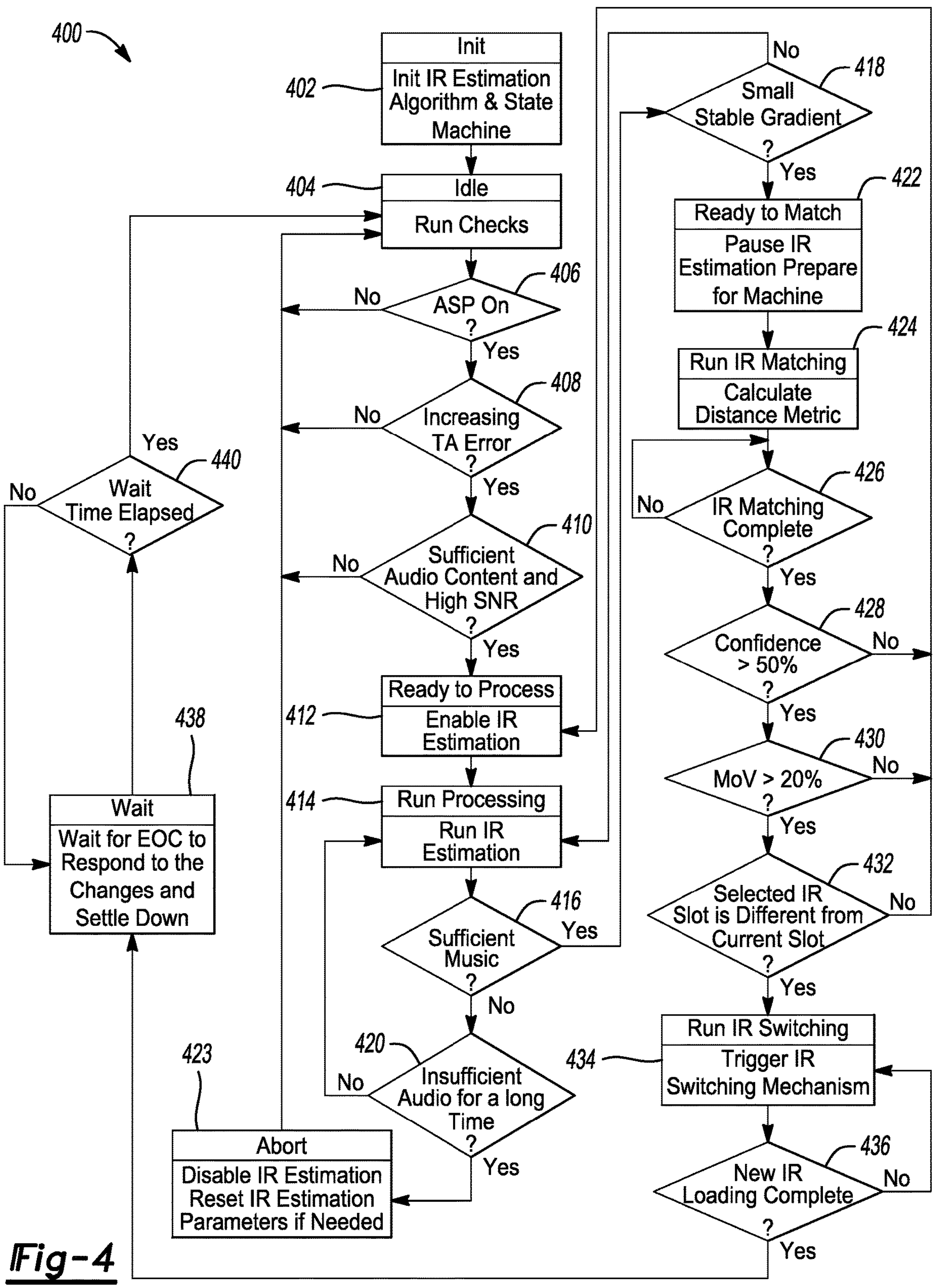
FIG. 4 generally depicts a state diagram (or method) for performing secondary path switching using IR fingerprinting in accordance with one embodiment.

FIG. 4 generally depicts a state diagram (or method) 400 for performing secondary path switching using IR fingerprinting in accordance with one embodiment. In state 402, the controller 303 sets the algorithm for performing secondary path switching, IR fingerprinting, and matching conditions to initial conditions. In operation 404, the controller 303 remains idle and runs checks. For example, the controller 303 may keep an estimate of the secondary acoustic transfer function $\hat{S}pu(z)$ IR estimation algorithm (or secondary path IR re-estimation) inactive until predetermined conditions have been met. For example, in operation 404, the controller 303 may continuously monitor levels of various sets of signals as will be discussed in more detail below to determine when to enable or active the secondary path IR re-estimation algorithm. In addition to monitoring levels of various sets of signals, the controller 303 may also determine whether there is sufficient spectral content and signal to noise (SNR) in the audio signals. Once these conditions have been met, the method 400 proceed to 412. In an embodiment, one or more of these quality checks can be omitted. In an embodiment, a different quality check, such as confidence score may be obtained as set forth in operation 428, can alleviate the need for one or more conditions or quality checks. Operation 428 will be described in more detail below.

In operation 406, the controller 303 determines whether an Adaptive Secondary Path (ASP) is initialized. The ASP corresponds to a process for performing an online secondary path estimate in a multiple input/multiple output (MIMO) environment. If the ASP process can identify a closer match to the secondary path, this aspect may improve cancellation performance and that secondary path will be utilized.

If this condition is true, then the method 400 moves to operation 408. If not, then the method 400 moves back to operation 404. In operation 408, the controller 303 determines whether an increasing True Audio (TA) error has occurred. The TA error corresponds to a difference between the audio signal predicted to be at the error microphone 106 and the actual audio signal at the error microphone 106. If this difference is increasing, the TA error indicates that the model of the secondary path is inaccurate.

If this condition is true, then the method 400 moves to operation 410. If not, then the method 400 moves back to operation 404.

In operation 410, the controller 303 determines whether there is sufficient audio content present and also whether the SNR for the audio signal is above a predetermined level. For the characterization of $\hat{S}pu(z)$ to be non-invasive, it is desired that the levels of any test signals be as low such that the test signals are as inaudible to passengers as possible. However, the level of the test signals needs to be high enough such that the test signals can be detected at the error microphones 106. This aspect provides a range of optimal amplitudes of the test signals. If this condition is true, then the method 400 moves to operation 412. If not, then the method 400 moves back to operation 404, as poor signal to noise ratio has rendered the test signals too noisy to be used to reliably estimate $\hat{S}pu(z)$.

In operation 412, the controller 303 prepares for processing. In other words, the controller 303 activates the secondary path IR re-estimation algorithm. In operation 414, the controller 303 works toward identifying the present audio configuration in the vehicle (or cabin in the vehicle). The controller 303 continues to determine whether the audio content is sufficient in terms of spectral density and SNR in operation 416. In general, the adaptive filter 108 may only be adapted when the audio content is sufficiently flat over the required bandwidth. To accomplish this aspect, the system 300 and the method 400 may use spectral descriptors such as spectral flatness to determine if the audio content will allow proper convergence of the adaptive filters.

With respect to SNR levels of the error microphones 106 in the vehicle, if background noise in the vehicle is much higher than the audio playing in the car, such noises may dominate estimation for the adaptive filter (or the secondary path estimation $\hat{S}pu(z)$). Thus, with this scenario, if audio is below the background noise of the vehicle, such a condition may indicate that secondary path estimation $\hat{S}pu(z)$ is unreliable. In addition, with respect to the error levels on the microphones 106, the overall levels in the microphone (e.g., ANC microphones) may also be used to determine whether the estimated secondary path $\hat{S}pu(z)$ is reliable. For example, if the microphone exhibits a consistently low amplitude, such a condition may indicate that the estimated secondary path $\hat{S}pu(z)$ is not yet reliable. If the controller 303 determines that the audio content is sufficient in terms of spectral density and SNR, the method 400 moves to operation 418. If not, then the method 400 moves to operation 420.

In operation 420, the controller 303 determines whether there is an insufficient amount of audio being received that exceeds a predetermined amount of time. If this condition is true, then the method 400 moves to operation 424 and aborts. If not, the method 400 moves back to operation 414. Also in operation 414, the controller 303 monitors one or more signals from the secondary path IR re-estimation algorithm to determine whether convergence has been achieved. In general, the error microphone 106 provides an output which indicates that $\hat{S}pu(z)$ has converged to an acceptable error to S(z). Additionally, or alternatively, signals derived from this error such as a gradient value from an adaptive filter using a gradient descent method may perform an online estimate of $\hat{S}pu(z)$.

In operation 418, the controller 303 determines whether the audio content is exhibiting a small stable gradient. For example, the controller 303 may compare a gradient on the audio content to a predetermined gradient value. A high gradient in the system 300 may indicate that the filters for the estimated secondary path (e.g., $\hat{S}pu(z)$) have not converged on the IRs on the actual secondary path S(z). Since the gradient is usually a vector quantity, an L2 norm may be used to determine a convergence of the estimated secondary path, (e.g., $\hat{S}pu(z)$) filters (or convergence of the adaptive filters). When the L2 norm is consistently low (or below the predetermined gradient value), this may be indicative of the estimated secondary path, $\hat{S}pu(z)$ being reliable. Thus, if this condition is true (e.g., gradient of the audio content is less than the predetermined gradient value), then the method 400 moves to operation 422. If not (e.g., gradient of the audio content is greater than the predetermined gradient value), then the method 400 moves back to operation 414.

In general, it may be desirable to ensure that the secondary path estimation $\hat{S}pu(z)$ is reliable and can be used to update the secondary acoustic transfer function, S(z) with the secondary path estimation $\hat{S}pu(z)$ such that the adaptation unit 110 can use the secondary path estimation $\hat{S}pu(z)$ to calculate the filter coefficients of the transfer function, W(z) for the adaptive filter 108. In general, while the system 300 may reliably generate $\hat{S}pu(z)$, this may not entail that the secondary path estimation of $\hat{S}pu(z)$ results in robust or reliable fingerprints. The system 300 is configured for a default $\hat{S}pu(z)$ when the system 300 starts up or may utilize the last determined $\hat{S}pu(z)$ during the last operation of the vehicle 313. The possible candidates for $\hat{S}pu(z)$ are determined based on selection that may minimize performance degradation in the maximum number of likely cabin configurations. The controller 303 also includes instructions for executing an adaptive filter (or deep learning, or system identification algorithm) that iteratively solves for the secondary path based on the reference component of the signal output from microphone 307 and the receipt of that signal through the actual secondary path, S(z) 112 by all error microphones 106.

There may be a number of reasons as to why the $\hat{S}pu(z)$ may not be reliable. For example, if the estimated secondary path estimation $\hat{S}pu(z)$ was obtained by the adaptive filter of the controller 303, the adaptive filter may have misadjusted due to a variety of reasons or include coefficients whose values approach infinity (or provides a divergent filter). Conversely, if the secondary path estimation $\hat{S}pu(z)$ was obtained by deep learning or system identification, then the estimate may not be accurate if the system was not trained and tested with as many real-world acoustic combinations as possible. Therefore, it is generally desirable to assess the reliability of $\hat{S}pu(z)$ coefficients before such coefficients may be used for fingerprinting and updating the coefficients of $\hat{S}pu(z)$.

A high error in system 300 may indicate that the filter for the estimated secondary path, $\hat{S}pu(z)$ are diverging from the actual IRs for the secondary path S(z). A large error may indicate that convergence has not occurred thus causing $\hat{S}pu(z)$ to be unreliable. Therefore, to implement this, the state machine (or the method 400) may compare the current error to a tunable threshold and if the error is below the threshold, then the method 400 may conclude that, for this metric, the $\hat{S}pu(z)$ is reliable. In general, the controller 303 monitors the error output by the microphone 216.

Generally, since the secondary path estimation $\hat{S}pu(z)$ may be estimated using one or more of these methods, the exact process for validating the secondary path estimation $\hat{S}pu(z)$ may vary. The method 400 provides an approach that uses many possible processes that are useful for validating the secondary path estimation $\hat{S}pu(z)$ based on adaptive system identification. Any combination of these techniques below could be used. An example of this can be seen in the method 400 between operations 404 (e.g., IDLE) and 414 (e.g., Run IR Estimation) also including operations 406, 408, 410, 416, 418, and 420.

In operation 422, the controller 303 disables or deactivates the secondary path IR re-estimation algorithm and initializes IR fingerprinting and matching process.

In operation 424, the controller 303 activates or triggers a matching algorithm to performing IR fingerprinting. The fingerprints of one or more IRs are derived in this operation. In general, the method 400 and the system 300 provides, for example, fingerprinting IRs to dynamically switch secondary path parameters in an online single input, single output (SISO) or MIMO ANC system, despite FIG. 1 and FIG. 2 showing a simplified schematic of the SISO ANC system. Fingerprinting involves, among other things, applying signal processing techniques to extract a unique signature from at least one, or every estimated impulse response $\hat{S}pu(z)$ in the system 300. Every IR in a multi-channel ANC system displays unique attributes about an electroacoustic path. These attributes account for signal processing components such as analog to digital (A/D) and digital to analog (D/A) converters, amplifiers, loudspeakers, microphones, and the acoustic path itself. The response of the electroacoustic path (i.e., the frequency response of the electroacoustic path), is affected to a greater degree by the acoustic properties of the vehicle cabin. For a typical vehicle cabin, the frequency response shows peaks and dips at various frequencies. In addition, the peaks and dips can shift in amplitude and frequency depending on a variety of factors such as temperature, seating configuration, number of vehicle occupants and so on. It is these variations in the frequency response that enable the opportunity to extract unique fingerprints from the IRs.

The pre-measured bank of IRs from the various configurations of the vehicle's cabin can be obtained either from a production vehicle IR measurement or from a different secondary path estimation, $\hat{S}pu(z)$ estimation technique. Another approach may involve using the secondary path estimation $\hat{S}pu(z)$ estimation algorithm itself to derive the pre-measured bank of IRs from the various acoustic cabin configuration. In addition, the controller 303 may assign each cabin acoustic configuration in this bank to a tag (bank1, bank2, etc.) or through the use of a lookup table (LUT) 320. The pre-measured bank of IRs may be stored in memory 322 (or the LUT 320) the associated with the controller 303 as pre-stored IRs for comparison to one or more of the estimated impulse responses $\hat{S}pu(z)$.

IRs measured in a production vehicle can yield more accurate fingerprints for multiple cabin configurations, because it uses a test signal to excite all frequencies. Another approach would be to use the $\hat{S}pu(z)$ IR estimation algorithm itself to derive the IRs from the various acoustic combinations. Finally, each cabin acoustic configuration in this bank is assigned a tag (bank1, bank2, and so on).

Once all the fingerprint characteristics have been extracted from the estimated $\hat{S}pu(z)$ IR, the system 300 and method 400 may match the estimated secondary path $\hat{S}pu(z)$ with an existing database of fingerprints (or predetermined (or pre-stored) secondary path estimations) from various cabin configurations is applied to find the closest match. Finally, the IR coefficients from the closest matching configuration are loaded by the adaptation unit 110 into the adaptive filter of the system 300. The system 300 performs the above method of estimating the impulse response and determining if there is a match to a prestored impulse response for every loudspeaker and microphone pair in the vehicle.

The matching process as executed by system 300 may involve the controller 303 calculating a distance metric, ascertaining a winner (e.g., the closest matched IR value to the pre-stored IR), a confidence level of the match between the closest matched IR value in the estimated secondary path $\hat{S}pu(z)$ to various pre-stored IR values, and determining a margin of victory (MOV) between the closest matched IR value to a plurality of the pre-stored IRs.

In operation 424, the controller 303 calculates the distance metric to determines the closest match between the secondary path estimate IR, $\hat{S}pu(z)$, and the bank of previously stored IRs. Examples of distance metrics may include Euclidean norm, Lp norms or their variations such as, for example, the Hausdorff distance and normalized misalignment. The distance metric is discussed in more detail in the '048 application.

In operation 426, the controller 303 determines whether the matching is complete. For example, the controller 303 establishes a voting matrix of the closest matched IR value relative to the closest previously stored IRs as stored in memory. If this condition is true (e.g., the voting matrix has been established), then the method 400 moves to operation 428. If not, then the method 400 moves back to operation 424.

In operation 428, the controller 303 establishes a confidence metric to determine a final winning IR configuration by considering aspects of the voting matrix. The controller 303 determines whether the IR candidate exhibits a confidence level of that is greater than a predetermined value (e.g., 50%). If this condition is met, then the method 400 moves to operation 432. If not, then the method 400 moves back to operation 412.

In operation 430, the controller 303 determines a margin of victory (MOV) between the IR value for the secondary path estimate $\hat{S}pu(z)$ and the closest IR value in the bank and the second closest IR value in the bank. The controller 303 determines whether the MOV is above a predetermined MOV threshold (e.g., 20%). If the MOV is above the predetermined MOV threshold, then the method 400 moves to operation 432. If not, then the method 400 moves back to operation 412.

In operation 432, the controller 303 determines if the selected IR slot is different from the current slot. If the selected IR slot is identical to the current IR slot, then the best-fit IR is currently in use by the ANC system 300, and there is no need to change to a different IR. If this condition is true, then the method 400 moves to operation 434 to perform the IR switching. If not, then the method 400 moves back to operation 412. In operation 434, the controller 303 executes or performs IR switching. For example, the controller 303 executes a trigger IR switching mechanism. In this case, the controller 303 executes the IR switching mechanism to start transitioning from the old $\hat{S}p(z)$ parameters with the new parameters that matched the $\hat{S}pu(z)$ measurement. An abrupt switch may momentarily degrade ANC performance but is also possible. To avoid this condition, the IR switching mechanism includes a smooth slewing approach to minimize any audible artifacts. A time constant for slewing may be tunable or variable but could be in the range of, for example, 100 ms to several seconds to complete. Another embodiment may include instantaneously updating the IR for the secondary estimation path with the $\hat{S}pu(z)$ coefficients for the adaptive filter 108. It is generally recognized that one aspect may involve utilizing the new parameters that matched the that matched the $\hat{S}pu(z)$ measurement, not the parameters that that correspond to the impulse response measurement (or $\hat{S}pu(z)$ measurement).

In general, the controller 303 may perform one of the following options when executing the IR switching mechanism. In a first option, the controller 303 updates all coefficients of the adaptive filter 108 via the adaptation unit 110. For example, the LMS parameters of step size and leakage may be temporarily modified so that when the unintended transient occurs, the adaptive filters 108 of the ANC system may not respond. In a second option, the controller 303 performs a slewed (average) update of all of the coefficients of the adaptive filter 108 via the adaptation unit 110 over a short period of time. In this case, the coefficients are gradually updated using, for example, an averaging filter to blend coefficients from the current value of the secondary path estimation $\hat{S}pu(z)$ to new targeted coefficient values for the secondary path estimation $\hat{S}pu(z)$. Averaging may either be linear or exponential and the total update time may be tunable (e.g., total update time range may be 40 ms to 5 seconds).

In operation 436, the controller 303 determines whether coefficients provided by the adaptation unit 110 to the adaptive filter 108 have been loaded properly. For example, the controller 303 monitors the state of the ANC after the switch has occurred in operation 434. If the proper coefficients have been property loaded, then the method 400 moves to operation 438. If not, then the method 400 moves back to operation 434.

In operation 438, the controller 303 executes a WAIT state. For example, the controller 303 determines whether the selected IR (or new IR) is stable. In general, after the update is complete, the controller 303 monitors the effects of the newly updated parameters. If the controller 303 detects divergence or the error signals with these new IRs from the newly measured $\hat{S}pu(z)$ seem excessively high or are higher than with the previous $\hat{S}pu(z)$ from immediately prior to the coefficient swap, the controller 303 could quickly revert to the previous parameters as such parameters are stored and not deleted. But if no issues are detected, then the controller 303 may keep the estimated coefficients for the adaptive filter 108 based on the estimated $\hat{S}pu(z)$ frozen for a longer period of time (ex. 5-30 minutes) before resuming the IR estimation algorithm and repeating the same logic described above for deciding if, when, and how to update $\hat{S}pu(z)$ again. This process may keep running for the entire duration of a vehicle ignition cycle. If the selected IR (or estimated secondary path $\hat{S}pu(z)$) is stable, then the method 400 moves to operation 440. If not, then the method 400 moves to back to operation 434. In operation 440, the controller 303 determines if a timer for the WAIT state has expired. The controller 303 employs the timer and waits for the timer to expire to determine if the state of the selected IR (or new IR) is stable. If the state of the selected IR is stable after the time expires, the method 400 moves to operation 404. If not, then the method 400 moves back to operation 438.

In general, aspects disclosed herein provide for a distance measurement (or misalignment) which is defined by an L2 Normalized Square Error between an estimated IR, $\hat{S}pu(z)$ and an actual IR, Sp(z). This may be defined mathematically by the following equation:

$$\text{Norm}\,(Sp(z)-\hat{S}pu(z))/\text{Norm}\,(Sp(z)),$$

which may then be converted to a logarithmic scale. It is recognized that the disclosed system may also perform the above equation in a time domain. This is generally referred to as a relative modeling error. One example of this relative modeling error is generally set forth in "A New Online Secondary Path Modeling Method with An Auxiliary Noise Power Scheduling Strategy for Narrowband Active Noise Control Systems", Sun et al., 29 Nov. 2017 which is hereby incorporated by reference in its entirety. The controller 303 provides a vector of distances between the various IRs, $\hat{S}pu(z)$ and the stored IRs in a distance matrix.

Figure 5:
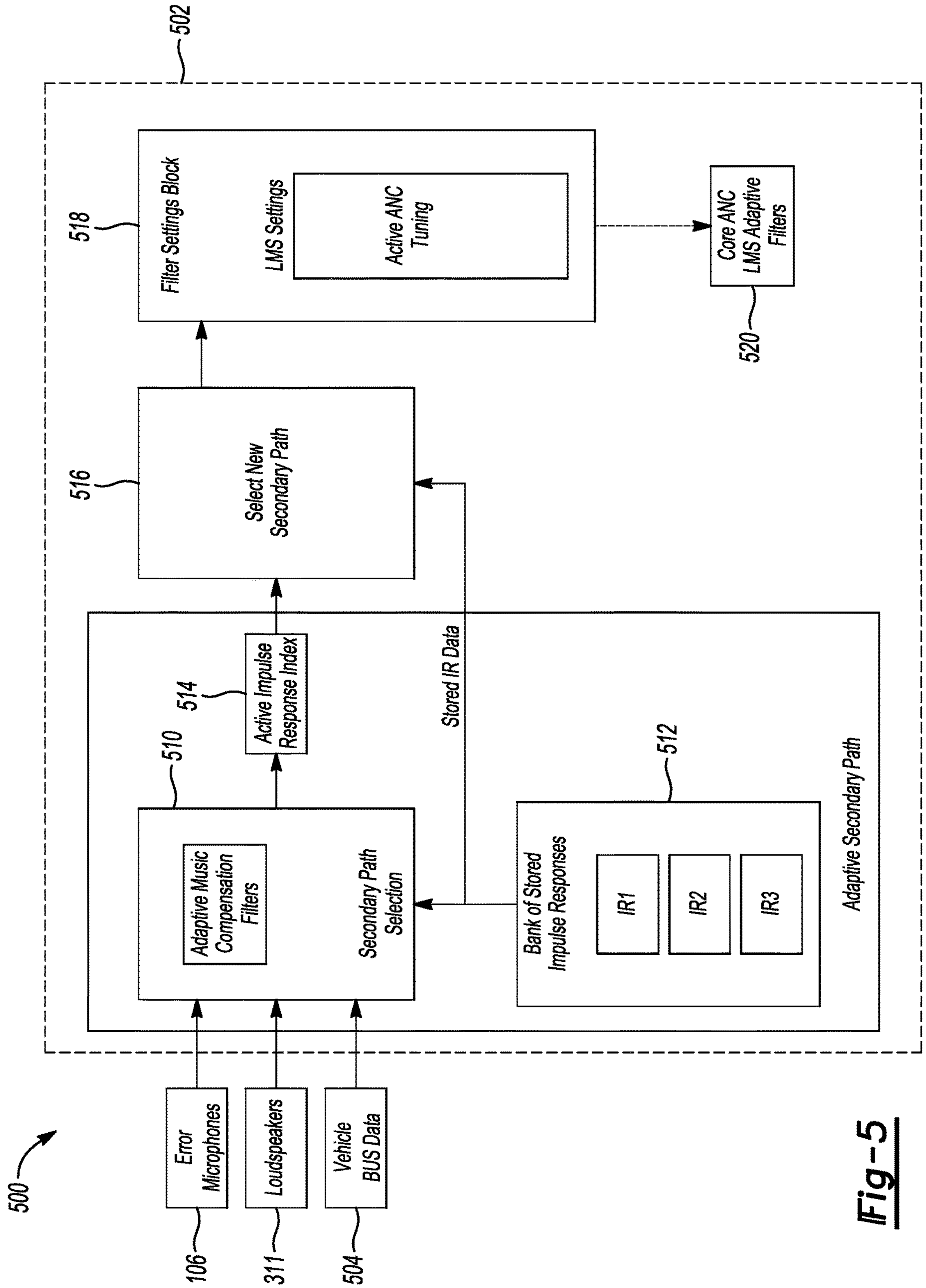
FIG. 5 generally depicts a first system for adjusting ANC tuning parameters in accordance with one embodiment.
Figure 6:
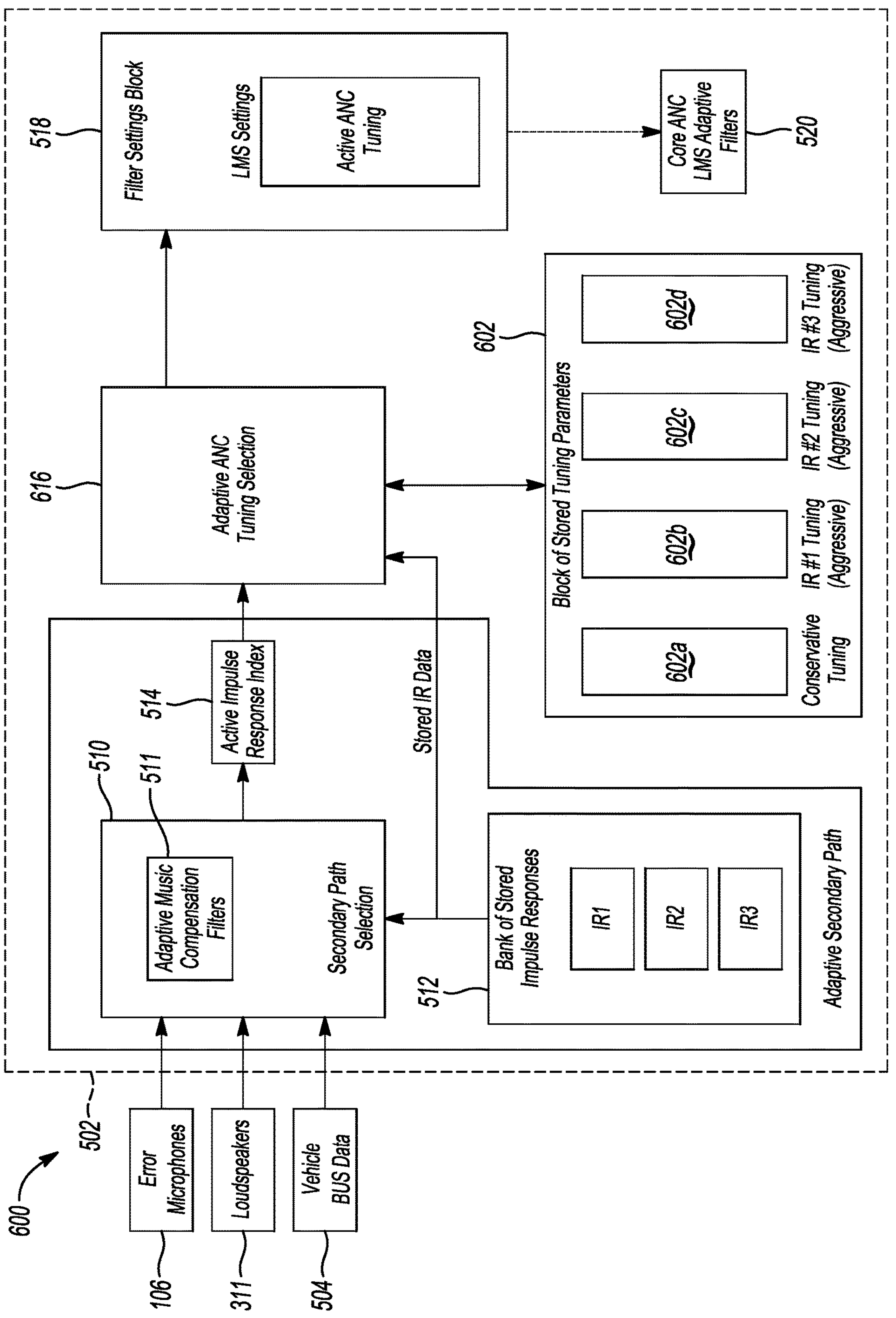
FIG. 6 generally depicts a second system for adjusting the ANC tuning parameters in accordance one embodiment.

With the embodiments as disclosed in FIGS. 4-6 hereafter, the disclosed systems provide a method for modifying an ANC tuning online. For example, the disclosed embodiments as set forth in FIGS. 6-7 extend the IR fingerprinting concept as set forth in connection with FIGS. 3 and 4 and generally in the '048 application by employing, among other things, a "conservative" tuning that may be used until a secondary path is determined. At that point, and after a successful detection, a more "aggressive" tuning may be calculated/loaded in real-time and used for a duration of the vehicle's ignition cycle with the embodiments disclosed below.

The embodiment as illustrated in connection with FIGS. 3 and 4, disclose, for example, a system for adaptively changing the secondary path of the ANC system. Prior feedforward ANC algorithms that were utilized for EOC and RNC typically include a static estimate of the secondary path between loudspeakers and error microphones. In general, typically, around five preproduction vehicles may have their IRs measured to create a single IR estimate that is stored in the thousands of production vehicles that are later produced. This, and the fact that the cabin configuration of the vehicle can change during runtime can create a mismatch between the actual and stored secondary path IRs. This mismatch leads to degraded noise cancellation performance and, in some cases, noise boosting.

The '048 application described, among other things, a method to intelligently update the static secondary path IR using an estimate of the actual cabin configuration to maintain noise cancellation performance. The estimated cabin configuration may be derived using one of several approaches which include generating test signals and measuring the response through the microphones or any other adaptive model of the cabin acoustics. The estimated IRs may be processed by a fingerprinting algorithm to seek the closest match from a bank of pre-measured IRs. In addition, the '048 application discloses a system and method for determining if, when, and how secondary path IRs should be estimated and updated. As a whole, the embodiments of the '048 application provided multiple techniques for detecting changes in cabin acoustics and safely updating the static secondary path IRs to achieve better noise cancellation performance for multiple cabin acoustic configurations.

FIG. 5 generally depicts a first system 500 for adjusting ANC tuning parameters in accordance with one embodiment. The first system 500 includes at least one controller 502 (the controller 502 hereafter) to select the corresponding IR. The controller 502 includes a secondary path IR selection block 510, a bank IR block 512, an active IR index block 514, a selector block 516, a filter setting block 518, and a core adaptive filter block 520 (or adaptive filter(s) 520). The secondary path selector 510 includes an adaptive music compensation canceller (AMIC) 511 or adaptive music compensation filters. The AMIC 511 uses music signals as test signals and the ANC error microphones 106 to estimate the secondary path IR between all loudspeakers 311 and the microphones 106. The first system 500 validates that the music signals have sufficient audio content to be considered an adequate test signal. Furthermore, the first system 500 employs additional signal processing to ensure that a unique IR for all the loudspeakers 311 and the microphones 106 can be obtained using the audio test signals. The controller 502 calculates new coefficients of the AMIC 511, in real time, using the music signals and can be copied into the estimated secondary path for the ANC system. A supervisor unit (not shown) manages enabling and disabling the AMIC as needed for calculating and copying coefficients.

The controller 502 receives signals from the error microphones 106, the loudspeakers 311, and a vehicle data bus 504. In general, the vehicle data bus 504 includes any information that indicates that the acoustics in the vehicle have changed. Examples of aspects being illustrative that vehicle acoustics have changed generally involve obtaining information regarding the status or various components in the vehicle. Such information may correspond to information related to window status (e.g., up, down or percentage open), trunk open/closed status, seat position status (e.g., a change in the location of the seat), or the number of occupants in the vehicle which may be obtained via seat weight sensors for occupancy detection. The existing secondary path selection block 510 includes a compensation block 511. The relevance of the blocks 510, 511, 512, 514, 516, 518, and 520 will be discussed in more detail below.

The controller 502 receives signals from the error microphones 106, the loudspeakers 311, and a vehicle data bus 504. The secondary path selector block 510 receives signals from the error microphones 106, the loudspeakers 311, and the vehicle data bus 504 and selects a corresponding stored IR from the bank IR block 512. The controller 502 may select the corresponding stored IR in the manner noted above in connection with FIGS. 3 and 4. The active IR index block 514 provides the corresponding stored IR to the selector block 516. The selector block 516 applies various filter settings as set forth in the filter setting block 518 to the stored IR as set forth in the selector block 516. The various filter settings (or tuning values) that may be applied correspond to an adaptive step size filter μ, leakage (γ), maximum output levels, etc. It is recognized that these filter settings may simply correspond to default values may remain constant for an ignition cycle regardless of what type of stored IR is being used. While this implementation with respect to the use of default filter settings may be useful and practice, this may hinder or limit achieving ANC performance. With respect to the maximum output levels relative to ANC, one problem that is known is the concept of when adaptive filters diverge. In this case, the anti-noise output starts growing in gain exponentially and a large and unpleasant noise may then be heard in-cabin. Therefore, most ANC applications may include a limiter which will not allow ANC anti-noise to go above a tuned "max output level". Typically, this maximum output tuning level is set to be slightly above that amount that is determined as a normal anti-noise output.

For example, constant tuning values may usually be derived to be the lowest values to achieve a stable ANC system or performance (e.g., a converged adaptive filter). However, such constant tuning values may be described as "conservative". In other words, tuning may be utilized that can manage large changes in an acoustic path (e.g., which appears as high feedback error) and that keeps the adaptive filter 108 from diverging. As generally known, divergence of the adaptive filter 108 may lead to loud boosting sounds in the cabin of the vehicle. However, by maintaining a "conservative" tuning with respect to the tuning values, this may result ANC performance that may be reduced from its true potential. This aspect may lead to frustration for Original Equipment Manufacturers (OEMs) as such OEMs desire the best or optimal cancellation performance while also ensuring that there are no cases of adaptive filter divergence.

Figure 7:
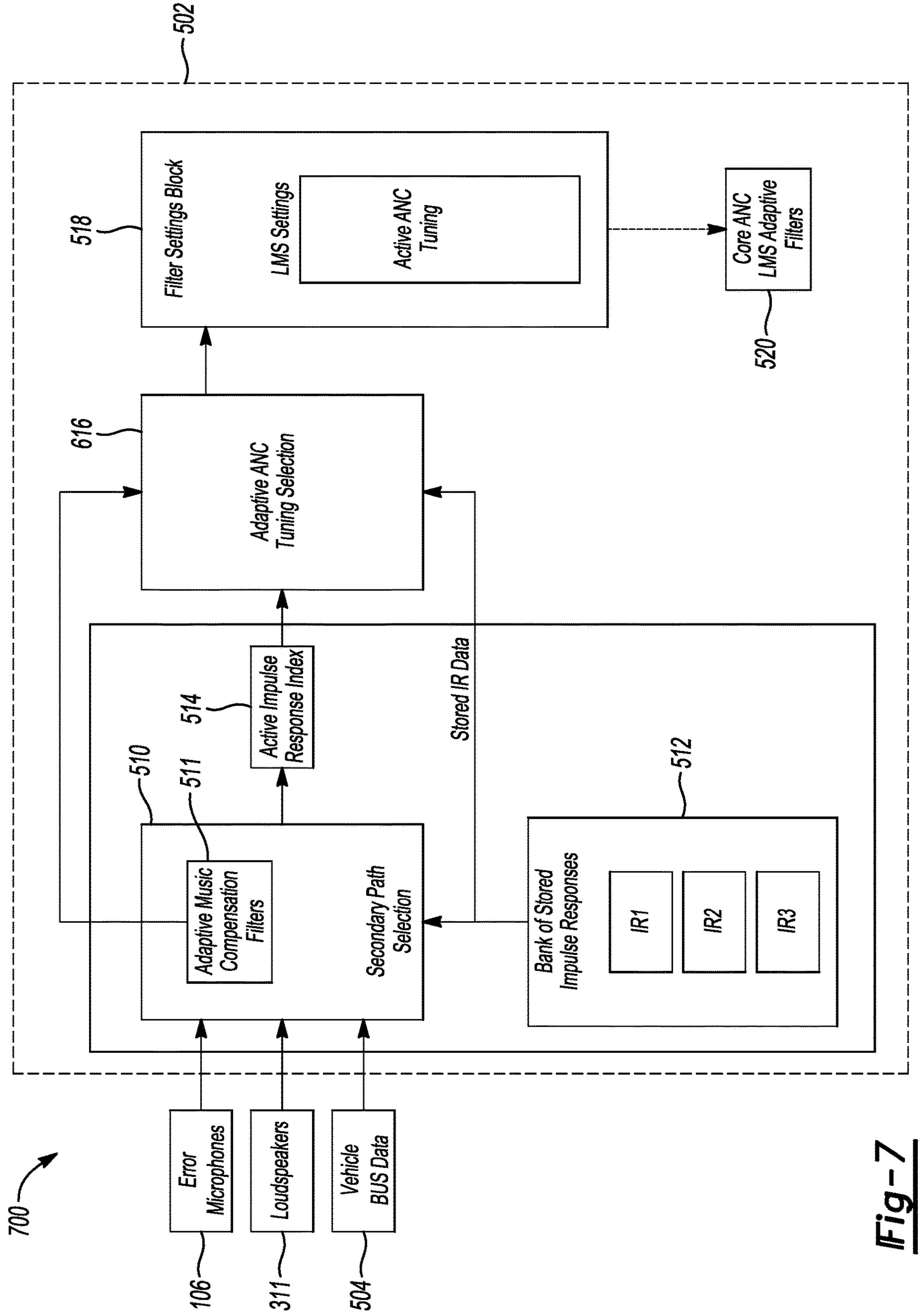
FIG. 7 generally depicts a third system for adjusting the ANC tuning parameters in accordance with one embodiment.

Aspects as set forth in FIGS. 6 and 7 provide, among other things, that additional tuning parameters beyond the stored IR are no longer constant and that such tuning parameters may be based on the selection of an ASP system (or selected IR).

FIG. 6 generally depicts a second system 600 for adjusting the ANC tuning parameters in accordance one embodiment. The system 600 may be executed along with the system 300 as set forth in reference to FIG. 3. The system 600 includes the controller 502 along with the error microphones 106, the loudspeakers 311, and the vehicle data bus 504. All references to the controller 502 hereafter may also perform the operations of the controller 303 as set forth in FIG. 3. The controller 502 includes the secondary path IR selection block 510, the bank IR block 512, the active IR index block 514, the filter setting block 518, and the core adaptive filter block 520. In addition, the controller 502 includes a tuning parameters block 602 and an adaptive tuning selection block 616.

In general, the tuning parameters block 602 stores a plurality of tuning parameters that may be applied based on which stored IR is selected. In one example, the tuning parameters block 602 may store a first tuning parameters setting 602*a*, a second tuning parameters setting 602*b*, a third tuning parameters setting 602*c*, and a fourth tuning parameters setting 602*d*. The first tuning parameters setting 602*a* may correspond to a conservative set of tuning parameters for the adaptive filter 108. In general, the controller 502 may apply the first tuning parameters setting 602 when a stored IR may not have been selected and this setting 602*a* may be considered a default setting until a stored IR is selected. Once the actual vehicle cabin acoustics are ascertained and the controller 502 is in a position to select a corresponding stored IR to match the vehicle cabin acoustics, the controller 502 may apply any one of the parameter settings 602*b*, 602*c*, or 602*d* based on how aggressive the tuning is required to be for a corresponding stored IR. Thus, in this regard it is recognized that the selected IR has a corresponding ideal set of parameter settings 602*a*, 602*b*, 602*c*, and 602*d* and the controller 502 selects the corresponding or appropriate tuning parameters setting 602*a*, 602*b*, 602*c*, and 602*d* that coincides with the selected IR to maximize performance. In general, it is recognized that system 600 may take some time (e.g., seconds or minutes, etc.) before a new stored IR may be selected by the controller 502 with confidence. While waiting for the vehicle cabin acoustics to stabilize, the controller 502 utilizes any one of the tuning parameters settings 602*a*, 602*b*, 602*c*, and 602*d* as a corresponding default setting (or conservative setting) and the first tuning parameters setting 602 may be selected on the basis that it provides a conservative unnoticeable effect on the occupants in the vehicle. The controller 502 may tune the adaptive filter 108 with any one of the parameters settings 602*a*, 602*b*, 602*c* or 602*d* after selecting the stored IR for a predetermined amount of time. In this regard, cancellation performance may be low but the conservative tuning parameters setting may guaranty stability across the various cabin acoustics. After stabilization, the controller 502 selects the desired parameters settings 602*a*, 602*b*, 602*c*, and 602*d* that is optimal for the selected IR. The particular settings parameter 602*a*, 602*b*, 602*c*, and 602*d* that coincides with the selected store IR may be determined during pre-production builds of the vehicle and are selected to ensure optimal ANC performance.

Once the system 600 selects the proper secondary path (or stored IR), the controller 502 may load any one of the first, second, third, or fourth tuning parameters 602*a*, 602*b*, 602*c*, 602*d* with the intention of maximizing ANC performance. Maximized ANC performance (or performance gain) may be achieved when the tuning parameters are more responsive since it is possible to guarantee that a feedback error that derives from errors in the secondary path has been minimized. It is possible to adjust varying levels of the tuning parameters such as adaptive step size filter μ, leakage (γ), maximum output levels, etc. In one example, the following may correspond to various conservative tunings: step size=0.005, leakage 0.001, and maximum output=−30 dB, etc. Whereas the following example may correspond to various aggressive tunings: step size of 0.1 to 0.5, leakage=0.0001 (which corresponds to less leakage), and maximum output=−10 dB (which allows for more output). The leakage (or leakage value) generally corresponds "forgetting factor" in adaptive filters. The leakage value is an amount that is removed from the LMS update equation in an effort to prevent divergence. A high leakage value provides a high chance of stable adaptive filters. However, the high leakage value also provides low cancellation because the high leakage value restricts the LMS update in the adaptive filter. Within the context of the system 600, low leakage values are more desirable, however, the system 600 can only use such lower leakage values the acoustic space in the vehicle is known or characterized.

In addition, the leakage may correspond to a stabilization method that changes the update formula in the adaptive filter such that a mean squared error but also a norm of the filter taps is minimized. This condition may prevent unbounded growth of the filter coefficients in cases of numerical ill-conditioning. In general, the leakage value is proportional to an amount of cancellation provided by the adaptive filter.

With respect to the operation of the system 600, the controller 502 receives signals from the error microphones 106, the loudspeakers 311, and the vehicle data bus 504. In particular, the secondary path selector block 510 receives signals from the error microphones 106, the loudspeakers 311, and the vehicle data bus 504 and selects a corresponding stored IR from the bank IR block 512. The controller 502 may select the corresponding stored IR in the manner noted above in connection with FIGS. 3 and 4. The active IR index block 514 provides the corresponding stored IR to the adaptive tuning selection block 516. The tuning parameters block 602 stores the first, the second, the third, and the fourth tuning parameters 602*a*, 602*b*, 602*c*, and 602*d*. In the event the controller 502 determines that the acoustics in the vehicle cabin have not yet stabilized, then the adaptive tuning selection block 616 selects the first tuning parameters 602*a* and applies such parameters in the filter setting block 518 as default. The controller 502 may then store such tuning parameters as set forth in the first tuning parameters setting 602*a* in the adaptive filter controller 110 as set forth in FIG. 3 such that the adaptive filter controller 110 controls the adaptive filter 108 also shown in FIG. 3 accordingly.

In the event the controller 502 determines that a new stored IR may be used with a high degree of confidence, the adaptive tuning selector block 516 selects any one of the first, second, third, or fourth tuning parameters 602*b*, 602*c*, and 602*d* that corresponds favorably with the new stored IR and applies such parameters in the filter setting block 518. In general, each of the tuning parameters 602*a*, 602*b*, 602*c*, 602*d* may correspond to a particular step size, leakage, and/or maximum output. It is recognized that the number of occupants detected in the vehicle, window open/closed (e.g., window 50% open or closed, etc.), trunk open/closed status, seat position status (e.g. a change in the location of the seat), generally affect the manner in which the stored IR is selected by the controller 502. Each of the tuning parameters 602*a*, 602*b*, 602*c*, 602*d* may include varying degrees of conservative and aggressive values. The controller 502 may then store such tuning parameters as set forth in the second, third, or fourth tuning parameters setting 602*b*, 602*c*, or 602*d* in the adaptive filter controller 110 such that the adaptive filter controller 110 controls the adaptive filter 108 accordingly.

The following example below illustrate one manner in which the disclosed embodiments may be implemented. In general, is a production vehicle (e.g., sedan) includes seats positioned in rows that are capable being folded down so that a driver or occupant can store large cargo in the trunk and into the vehicle cabin. The vehicle in often cases may include a loudspeaker in the form of a subwoofer positioned in the trunk and the overall sound system for the vehicle may also be equipped with an ANC system. In this case, the ANC algorithm is currently executing a conservative tuning (e.g., step size low<0.05), high leakage>0.01), and low max output<−30 dB). The reason for the ANC system executing this conservative tuning is that there may not be a vehicle bus message for when the rear seat is folded down. Thus, in this regard, the ANC tuning may have to always be prepared for that scenario even though this condition is infrequent. If the tuning is not conservative, then the ANC system may diverge and become unstable resulting in ANC boosting.

However, with an ASP system as set forth herein in place, the starting (or initial) tuning may be aggressive (e.g., step size high>0.1, low leakage<0.001, and max output can be set higher (e.g., <−10 dB). These setting may enable more performance and the system is guaranteed to be stable because ASP (e.g., the disclosed system 500, 600, 700) is assuring the vehicle that the rear seat is not folded down. Then, in the event the rear seat is folded down, the system 500, 600, 700 detects this condition, switches the secondary path to a different tuning that is less aggressive but not as conservative as the case above without ASP. After the switching, the tuning may be considered to be a tuning that is between conservative settings and aggressive settings.

FIG. 7 generally depicts a third system 700 for adjusting the ANC tuning parameters in accordance with one embodiment. The third system 700 share similar aspects as noted in connection with the second system 600. However, the third system 700 may not require the tuning parameters block 602. Instead, the controller 502 may calculate the various tuning parameters for the adaptive filter controller 110 (e.g., LMS settings) to apply in real time. This may be advantageous since this aspect may not necessitate for the controller 502 to consume large amounts of embedded processor memory in comparison to the second system 600. The controller 502 may run the real-time calculation as a background task to minimize the impact to normal execution time.

In one example, the controller 502 may employ a real-time calculation by utilizing a constant offset (e.g., a single tunable value that is added to each tuning table). For example, the controller 502 may add a predetermined step value (e.g., 0.05) to all LMS (or adaptive filter controller 110) step entries which may be normally a table of 256 entries). Similar, the controller 502 may add a predetermined leakage value, for example, such as −0.01 to all LMS leakage entries (also to a large table).

In another example, the controller 502 may employ a real time calculation by utilizing variable offset/lookup table offsets. In this method, the controller 502 may add the offset to the step or leakage tables no longer as a single constant value as note above, but rather as variable value that is calculated by the controller 502. For example, the controller 502 may utilize a simple linear or polynomial equation to determine the variable to be applied to the step or leakage tables (e.g., or to any of the tuning parameters). For example, the controller 502 may utilize a descending line for a step size that allows higher step values for low frequencies and smaller increases for high frequencies. The tuning parameters may include a slope and y-intercept (e.g., the controller 502 may execute a step equation such as, for example, $y=-0.001x+0.09$ where x is a tuning table index (i.e., lower index means lower frequency)0.

The controller 502 may also run in a real time, eigenvalue (2) equations to calculate or apply variable tuning parameters. One example of an eigenvalue equation is set forth in "Signal Processing for Active Control" S. J. Elliott, 2001. Essentially, an eigenvector v of a linear transformation T may be a nonzero vector that, when T is applied to the non-zero vector, there is no change in direction. Applying the linear transformation T to the eigenvector may only scale the eigenvector by the scalar value λ, called an eigenvalue. In this application, the controller 502 may derive the eigenvalue between the selected IR and the actual music compensation filter coefficients. In general, the music compensation filters reflect the actual cabin acoustics and the stored IR selected is the best match. By using eigenvalues, the controller 502 may employ a new optimized set of LMS step and leakage values that may be similar to the variable offset and look-up tables calculation method. The difference is that the controller 502 may utilize eigenvalues as the basis of calculations for new tuning values for the adaptive filter controller 110 and/or adaptive filter 108.

In general, aspects disclosed herein may remove "conservative" tuning of the adaptive filter 108 and/or adaptive filter controller 110 and may allow production vehicles to be tuned in a more "aggressive" fashion that enables increased ANC performance. This may occur upon detecting that the disclosed systems have correctly identified the correct secondary path (or correct stored IR) that matches the actual vehicle acoustics. Once the correct secondary path or stored IR has been identified, the disclosed embodiments modify the base "conservative" tuning with "aggressive" values that make the ANC adaptive filters more responsive since it is possible to ensure that the feedback error that derives from errors in the secondary path has been minimized.

In addition, the disclosed embodiments may enable for the use of a "conservative" tuning on amplifier/head unit on boot up. Basically, such an amplifier/head unit utilize the normal "conservative" tuning values until the adaptive secondary path algorithm selected the proper secondary path (or stored IR) is selected with high confidence. As noted, the disclosed embodiments may utilize one system that is optimized for memory consumption (e.g., the system 700), and another system (e.g., the system 600) that is optimized for execution time.

As noted above, the system 600 may be execution time optimized. Thus, if the final application has a large amount of memory, but reduced processor speed, all of the "aggressive" data can be simply stored in memory. When the system 600 detects a change in the impulse response, the adaptive filter controller 110 (and hence the adaptive filter 108) is completely loaded using the data stored in memory.

As also noted above, the system 700 may be memory optimized. Thus, in this implementation, the controller 502 may calculate the tuning values in an "aggressive" manner which can then be calculated in real-time. This has the benefit of reducing memory consumption because there is no need to store multiple tables of data. Instead of loading pre-stored data, this implementation may calculate a more ideal set of tuning data based on the active IR.

Figure 8:
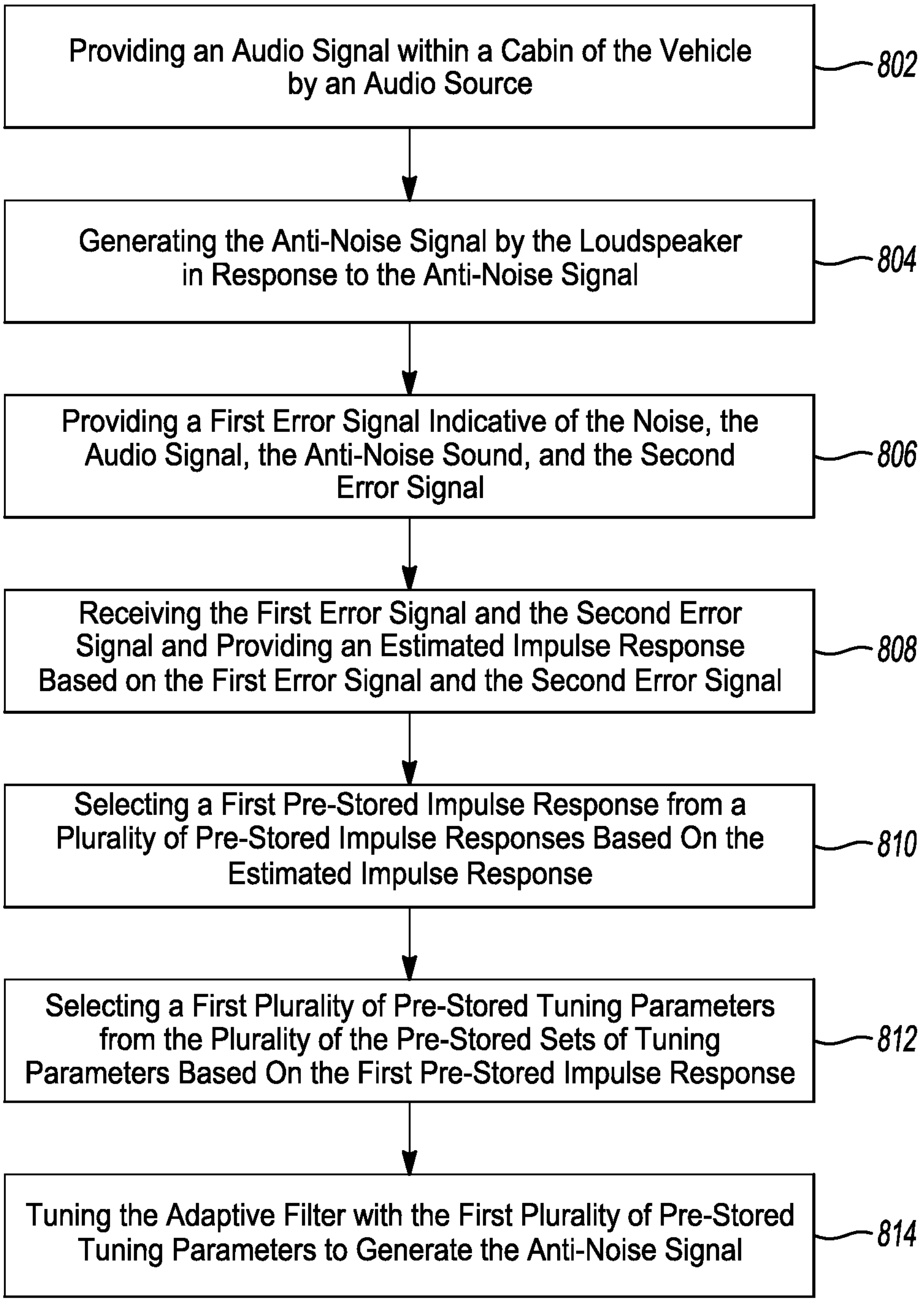
FIG. 8 depicts a method for executing the second system for adjusting the ANC tuning parameters in accordance with one embodiment.

FIG. 8 depicts a method 800 for executing a least the systems 300 and 600 (see also FIGS. 3 and 6) for adjusting the ANC tuning parameters in accordance with one embodiment.

In operation 802, the audio source 305 provides an audio signal (a[n]) within a cabin of the vehicle 313.

In operation 804, the loudspeaker 311 generates the anti-noise sound (e.g., in a cabin of a vehicle 313) in response to the anti-noise signal y'[n].

In operation 806, the microphone 106 provides a first error signal (e[n]) indicative of the noise (d[n]), the audio signal (a[n]), and the anti-noise sound (y[n]) within the cabin and a second error signal (y^[n]) indicative of an estimated anti-noise signal.

In operation 808, the controller 303 and/or 502 receives the first error signal (e[n]) and the second error signal (y^[n]) and provides an estimated impulse response $\hat{S}_{pu}(z)$ based on the first error signal (e[n]) and the second error signal (y^[n]).

In operation 810, the controller 303 and/or 502 selects a first pre-stored impulse response from a plurality of pre-stored impulse responses (e.g., IR1, IR2, IR3) (see 512) based on the estimated impulse response $\hat{S}_{pu}(z)$ to filter one or more reference signals at the adaptive filter 108 to generate the anti-noise signal y'[n].

In operation 812, the controller 303 and/or 502 selects a first plurality of pre-stored tuning parameters 602*a*, 602*b*, 602*c*, or 602*d* from the plurality of pre-stored sets of tuning parameters 602*a*, 602*b*, 602*c*, 602*d* based on the first pre-stored impulse response (e.g., IR1, IR2, or IR3).

In operation 814, the controller 303 and/or 502 tune the adaptive filter 108 with the first plurality of pre-stored tuning parameters 602*a*, 602*b*, 602*c*, or 602*d* to generate the anti-noise signal y'[n].

Figure 9:
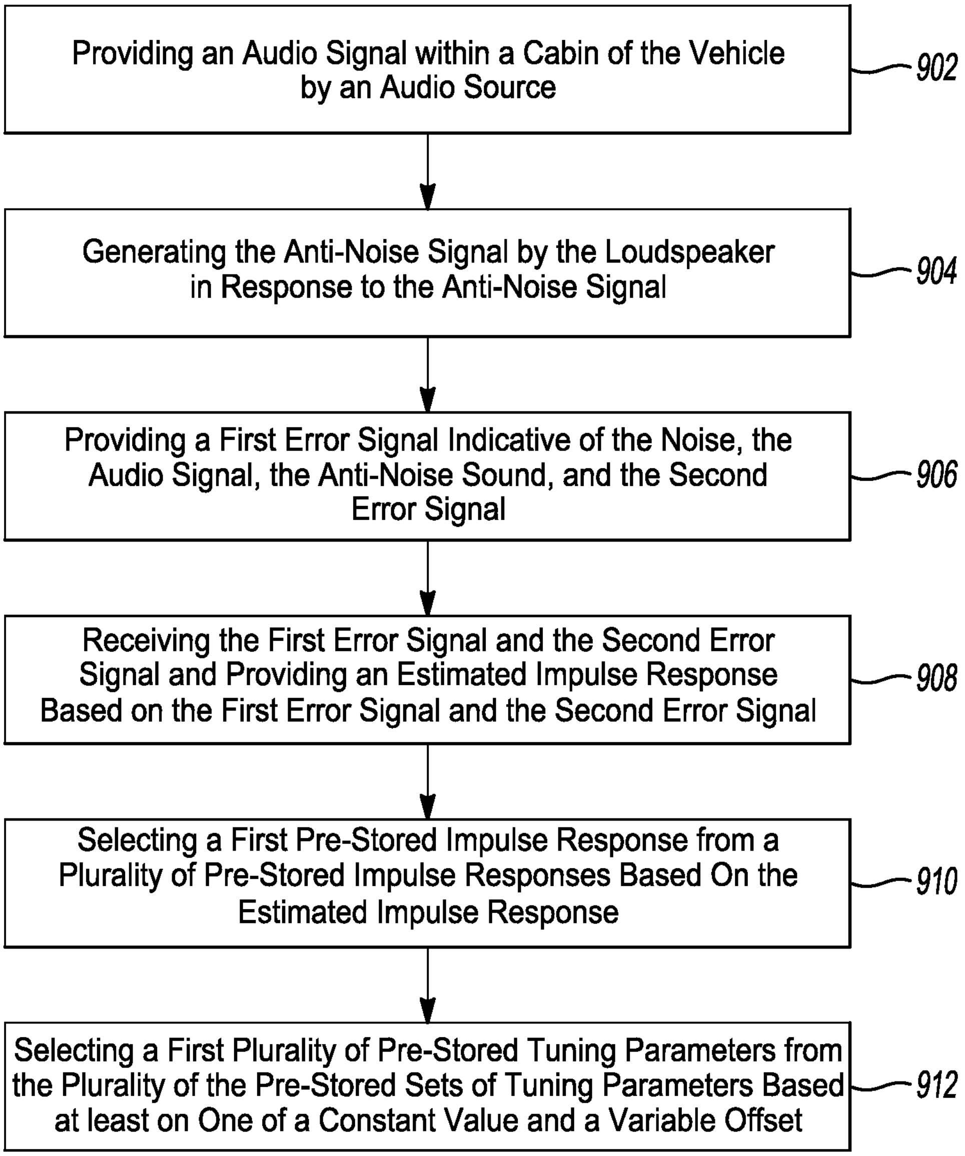
FIG. 9 depicts a method for executing the third system for adjusting the ANC tuning parameters in accordance with one embodiment.

FIG. 9 depicts a method 900 for executing a least the systems 300 and 600 (see also FIGS. 3 and 6) for adjusting the ANC tuning parameters in accordance with one embodiment.

In operation 902, the audio source 305 provides an audio signal (a [n]) within a cabin of the vehicle 313.

In operation 904, the loudspeaker 311 generates the anti-noise sound (e.g., in a cabin of a vehicle 313) in response to the anti-noise signal y'[n].

In operation 906, the microphone 106 provides a first error signal (e[n]) indicative of the noise (d[n]), the audio signal (a [n]), and the anti-noise sound (y[n]) within the cabin and a second error signal (yˆ[n]) indicative of an estimated anti-noise signal.

In operation 908, the controller 303 and/or 502 receives the first error signal (e[n]) and the second error signal (yˆ[n]) and provides an estimated impulse response Ŝpu(z) based on the first error signal (e[n]) and the second error signal (yˆ[n]).

In operation 910, the controller 303 and/or 502 selects a first pre-stored impulse response from a plurality of pre-stored impulse responses (e.g., IR1, IR2, IR3) (see 512) based on the estimated impulse response Ŝpu(z) to filter one or more reference signals at the adaptive filter 108 to generate the anti-noise signal y'[n].

In operation 912, the controller 303 and/or 502 selects a first plurality of pre-stored tuning parameters 602*a*, 602*b*, 602*c*, or 602*d* based at least on one of a constant offset that is applied to one or more baseline tuning parameters and a variable offset value that is applied to the one or more baseline tuning parameters.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An active noise cancellation (ANC) system comprising:

at least one audio signal source to provide an audio signal in a cabin of a vehicle;

at least one loudspeaker to project anti-noise sound within the cabin of a vehicle in response to receiving an anti-noise signal;

at least one microphone to provide a first error signal indicative of noise, the audio signal, and the anti-noise sound within the cabin and a second error signal indicative of an estimated anti-noise signal; and at least one controller programmed to:

receive the first error signal and the second error signal; and provide an estimated impulse response based at least on the first error signal and the second error signal;

select a first pre-stored impulse response from a plurality of pre-stored impulse responses based on the estimated impulse response to filter one or more reference signals at an adaptive filter to generate the anti-noise signal, and select a first plurality of pre-stored tuning parameters from a plurality of pre-stored sets of the tuning parameters based on the first pre-stored impulse response; and tune the adaptive filter with the first plurality of pre-stored tuning parameters to generate the anti-noise signal.

2. The ANC system of claim 1, wherein the first plurality of pre-stored tuning parameters corresponds to default tuning parameters.

3. The ANC system of claim 2, wherein the at least one controller is further programmed to tune the adaptive filter with the default tuning parameters for a predetermined amount of time to enable the adaptive filter to stabilize after executing the adaptive filter with the first pre-stored impulse response.

4. The ANC system of claim 3, wherein the at least one controller selects a second plurality of pre-stored tuning parameters from the plurality of pre-stored sets of the tuning parameters upon expiration of the predetermined amount of time.

5. The ANC system of claim 1, wherein the first plurality of pre-stored tuning parameters includes at least one of a step size for the adaptive filter, a leakage value, and a maximum output level.

6. The ANC system of claim 5, wherein the step size for the adaptive filter corresponds to a constant value keeps the adaptive filter stable at a maximum possible speed of convergence.

7. The ANC system of claim 5, wherein the leakage value is proportional to an amount of cancellation provided by the adaptive filter.

8. The ANC system of claim 5, wherein the maximum output level corresponds to a limit that ANC noise will not exceed when the anti-noise signal is generated.

9. An active noise cancellation (ANC) system comprising:

at least one audio signal source to provide an audio signal in a cabin of a vehicle;

at least one loudspeaker to project anti-noise sound within the cabin of a vehicle in response to receiving an anti-noise signal;

at least one microphone to provide a first error signal indicative of noise, the audio signal, and the anti-noise sound within the cabin and a second error signal indicative of an estimated anti-noise signal; and at least one controller programmed to:

receive the first error signal and the second error signal; and provide an estimated impulse response based at least on the first error signal and the second error signal;

select a first pre-stored impulse response from a plurality of pre-stored impulse responses based on the estimated impulse response to filter one or more reference signals at an adaptive filter to generate the anti-noise signal, and select a first plurality of tuning parameters based at least on one of a constant offset that is applied to one or more baseline tuning parameters and a variable offset value that is applied to the one or more baseline tuning parameters, and tune the adaptive filter with the first plurality of tuning parameters to generate the anti-noise signal.

10. The ANC system of claim 9, wherein the at least one controller is further programmed to execute a linear or polynomial equation to determine the variable offset value that is applied to the one or more baseline tuning parameters.

11. The ANC system of claim 9, wherein the at least one controller is further programmed to execute one or more eigenvalue-based equations to generate the variable offset value.

12. The ANC system of claim 9, wherein the first plurality of tuning parameters includes at least one of a step size for the adaptive filter, a leakage value, and a maximum output level.

13. The ANC system of claim 12, wherein the step size for the adaptive filter corresponds to a constant value keeps the adaptive filter stable at a maximum possible speed of convergence.

14. The ANC system of claim 12, wherein the leakage value is proportional to an amount of cancellation provided by the adaptive filter.

15. The ANC system of claim 12, wherein the maximum output level corresponds to a limit that ANC noise will not exceed when the anti-noise signal is generated.

16. A method for performing active noise cancellation (ANC), the method comprising:

generating an audio signal to transmit in a cabin of a vehicle with at least one audio signal source;

transmitting an anti-noise sound in the cabin of the vehicle via at least one loudspeaker in response to receiving an anti-noise signal;

providing a first error signal indicative of noise, the audio signal, and the anti-noise sound within the cabin and a second error signal indicative of an estimated anti-noise signal;

receiving the first error signal and the second error signal by at least one controller; and providing an estimated impulse response based on the first error signal and the second error signal;

selecting a first pre-stored impulse response from a plurality of pre-stored impulse responses based on the estimated impulse response to filter one or more reference signals at an adaptive filter to generate the anti-noise signal, selecting a first plurality of pre-stored tuning parameters from a plurality of pre-stored sets of the tuning parameters based on the first pre-stored impulse response; and tuning the adaptive filter with the first plurality of pre-stored tuning parameters to generate the anti-noise signal.

17. The method of claim 16, wherein the first plurality of pre-stored tuning parameters includes at least one of a step size for the adaptive filter, a leakage value, and a maximum output level.

18. The ANC system of claim 17, wherein the first plurality of pre-stored tuning parameters includes at least one of a step size for the adaptive filter, a leakage value, and a maximum output level.

19. The ANC system of claim 17, wherein the step size for the adaptive filter corresponds to a constant value keeps the adaptive filter stable at a maximum possible speed of convergence.

20. The ANC system of claim 17, wherein leakage value is proportional to an amount of cancellation provided by the adaptive filter.

* * * * *